Patented Apr. 17, 1951

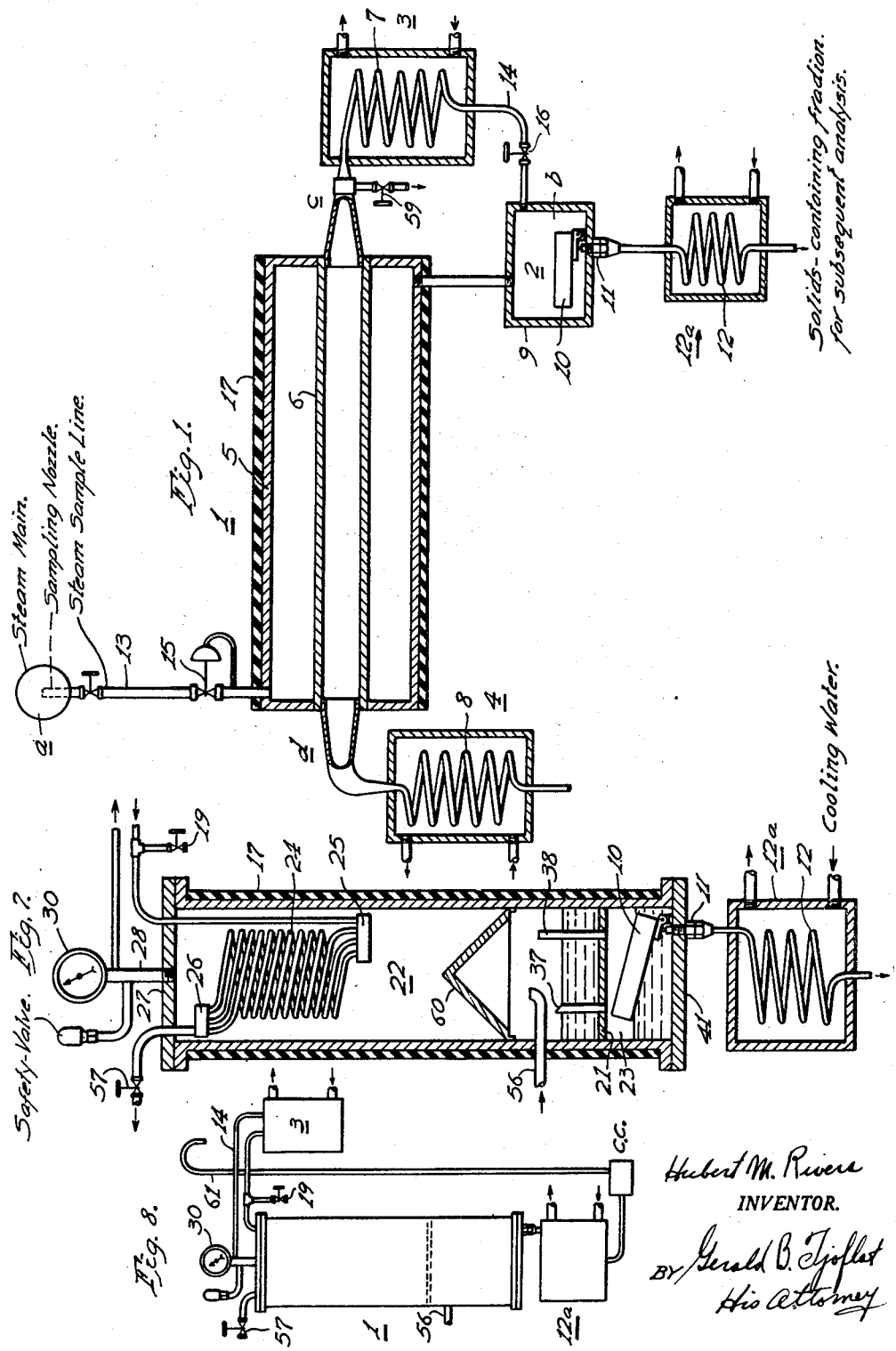

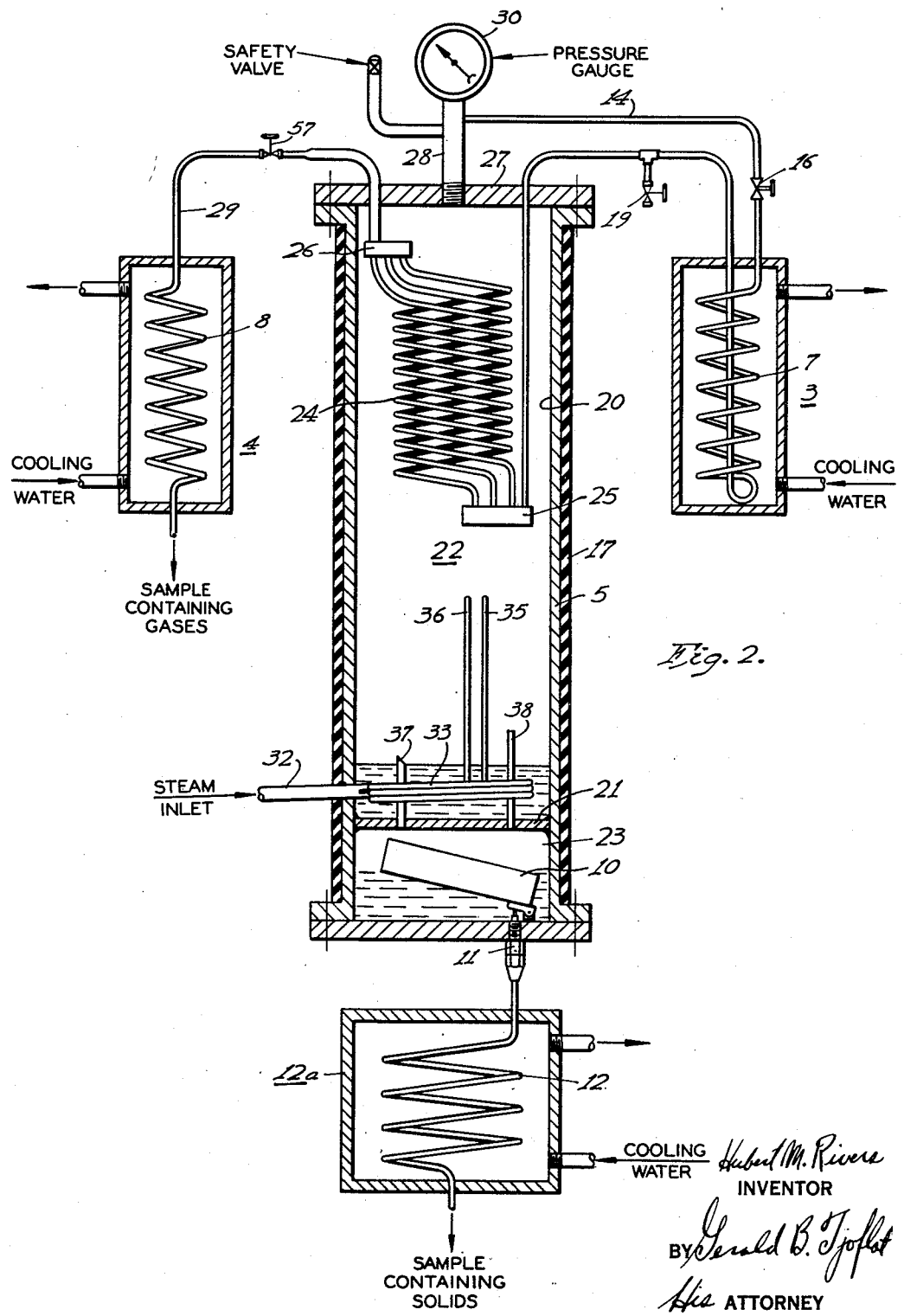

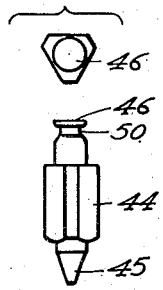
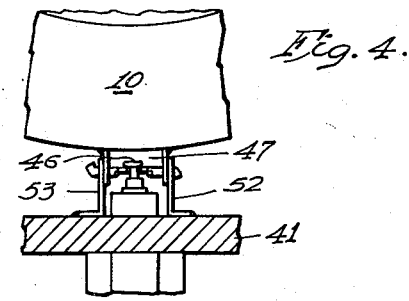
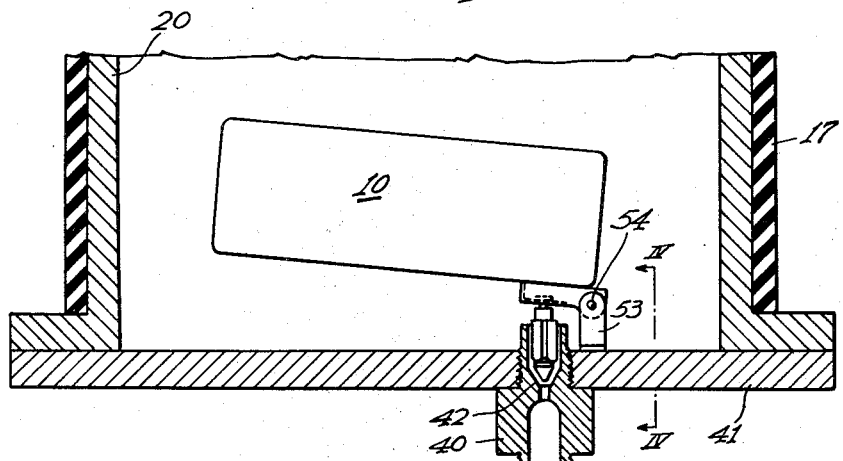
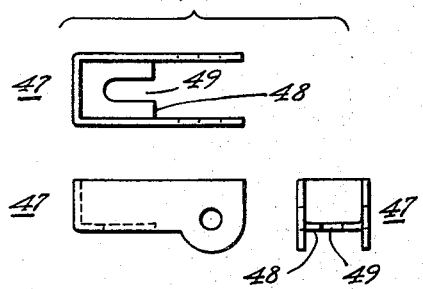

2,549,388

UNITED STATES PATENT OFFICE 2,549,388

METHOD AND APPARATUS FOR EFFECTING SELF-REGULATED PARTIAL CONDENSATION OF CONDENSABLE VAPORS

Hubert M. Rivers, Philadelphia, Pa., assignor to Hall Laboratories, Inc., a corporation of Pennsylvania Application July 22, 1948, Serial No. 40,138

23 Claims. (Cl. 202—69)

This invention relates to method and apparatus for determining purity of steam.

Steam as produced in the usual steam generator or boiler may be contaminated by either solid or gaseous impurities, or both. The gases are ordinarily ammonia and carbon dioxide but hydrogen, hydrogen sulfide, and other gases may also be present. The concentration of solids and gases in steam is a measure of its purity. The lower the concentration, the higher the purity, the purity being poorer as the concentration increases.

In determining the purity of steam, it may be that one is interested primarily in the solids concentration in the steam, or the interest may be in knowing the concentration of gas or gases, or it may be desirable to know both concentrations. If the concentration of solids is to be determined by conductivity measurements of a condensed sample of the steam, the sample should be free of gas to the extent that gas error does not materially affect the conductivity measurement. Likewise, the determination of gases in steam condensate can sometimes best be made on samples free of solids such as mineral salts, particularly alkaline salts. The presence of particular gases in steam, such as hydrogen for example, may be of particular interest as an indication that boiler metal is being, or in danger of being, corroded.

According to my invention, I separate a flowing steam sample into two fractions, one containing the solids and the other the gas in the steam, and I so carry on the separation that the weight ratio of the one fraction to the other is substantially constant at all times regardless of wide variations in operating conditions. Thus in the case of a steam sample flowing at the rate of $W$ pounds per unit time, if the weights of the solids-containing and gas-containing fractions are designated as $S_w$ and $G_w$, respectively, the ratios $S_w/W$, $G_w/W$, and $S_w/G_w$ will remain substantially constant under all normal conditions of operation.

Having separated the steam sample into two fractions of known magnitude, it follows that if the mineral contamination in the solids fraction is found to be, say 10.0 P. P. M., the concentration of solids in the original steam sample will be 5.0 P. P. M., assuming the solids fraction to be one half of the total steam sample. Likewise, if the concentration of a given gas in the gas containing fraction is found to be, for example, 20 P. P. M., the concentration in the total steam sample would be 10 P. P. M, assuming the gas fraction to be one half of the original steam sample.

The invention is applicable to the separation or splitting of a continuously flowing steam sample so that a continuous record of the steam purity can be available. It is self-evident, of course, that the invention need not be in practice hour after hour in order for the splitting of a flowing steam sample to be achieved. The steam sample is split while flowing and the sample is to be regarded as flowing whether determinations are made continuously or during desired periods of time which are not continuous.

In order to obtain continuous splitting of a steam sample into two fractions, the gas- and solids-containing portions, wherein the ratio of one to the other is substantially a constant, it is important that the splitting be accomplished automatically in spite of normal and uncontrollable variations in steam pressure, sample flow rate, cooling water supply, etc.

According to my invention, the splitting of the steam into two portions or fractions, one containing the gases and the other the solids substantially gas free, is accomplished by passing the steam through a heat exchanger comprising a shell and a heat transfer element such as a tube or coil. Steam contacts one surface of the heat transfer element and coolant contacts the opposite surface. The transfer of heat from the steam to the coolant causes a portion of the steam to condense, the amount condensed being in proportion to the total heat given up to the coolant. This condensed portion contains the solids of the total steam sample and is therefore designated the solids fraction, $S$. The uncondensed steam contains substantially all of the gases of the total steam sample and is designated the gas fraction, $G$. The uncondensed gas fraction is condensed outside the heat exchanger and returned to it as coolant. The condensed G fraction acting as coolant, is re-evaporated into steam by a part of the total heat of the steam sample, thereby causing partial condensation of the steam sample to form the solids fraction, $S$. Since the condensed G fraction is the coolant, splitting of the steam sample into the S and G fractions, each having substantially constant ratios of $S_w/W$ and $G_w/W$, is effected automatically.

In an arrangement such as described above, the portion of the splitter receiving the steam sample may be called the steam space of the splitter and the space through which the condensed G fraction flows may be called the coolant space. It is self-evident that the steam can be in one or the other of these spaces and the coolant in the other so long as they are separated by a heat transfer surface such as the wall of a tube or coil.

Once the process is started and steam is continuously supplied to the steam space, the splitting of the steam by partial condensation will proceed automatically. The exact value of the ratio of the gas-containing fraction to the solids-containing fraction will be determined by heat balance characteristics existing for each individual installation; but the value of this ratio will be approximately equal to 1.0 and will remain substantially constant despite wide fluctuations in the operational variables involved.

This method of splitting a steam sample is also adapted to effect splits in which the solids in the S fraction may be concentrated to a much higher degree than it is when the splits of the gas- and solids-containing fractions are approximately equal. By withdrawing a predetermined amount of the gas fraction prior to the point where it normally would enter the heat exchanger as coolant, the weight of the solids-containing fraction condensing out in the steam space will be less but the concentration of solids will be proportionately higher.

For example, if 80% of the total steam sample is wasted as gas fraction prior to the heat exchanger, then only 10% of the sample as gas fraction will pass through the heat exchanger and 10% of the steam will condense as the solids-containing fraction. Thus, if 10% of the total sample contains the solids, the concentration will be ten times greater than the concentration in original steam sample.

By regulating the amount of the gas fraction wasted or withdrawn, the concentration of solids in the S fraction can be adjusted as desired, within the limits of solubility of the solids. If the concentration of solid impurities in the steam sample is quite low, it may be desirable or necessary to concentrate the solids-containing fraction in this way so as to obtain greater accuracy in determining the solids content by conductimetric or other conventional analytical methods.

An object of this invention is to provide apparatus for automatically splitting a flowing steam sample containing gases and solids into two fractions, one containing the gases and the other the solids in the steam.

Another object of the invention is to provide apparatus of the character referred to above in which the weight ratio of the gas-containing fraction to the solids-containing fraction will be substantially constant.

A further object of the invention is to provide apparatus of the character referred to above in which the gas-containing fraction shall be condensed out of contact with the total steam sample and the solids-containing fraction, and then utilized as the medium for effecting by partial condensation the splitting of the total steam sample into the solids- and gas-containing fractions.

A still further object of the invention is to provide apparatus of the character referred to above with means whereby a part of the heat in the total steam sample may be utilized to effect boiling of the condensed solids-containing fraction to insure maximum removal of any gas remaining in the solids fraction condensate produced by partial condensation of the original steam sample.

And a still further object of the invention is to provide apparatus of the character referred to above with means for converting either or both of the gas- and solids-containing fractions into a condition whereby the concentration of gas and solids may be selectively determined by conductivity measurement or other methods of analysis.

The foregoing and other objects of the invention will be apparent to those skilled in this art from the following description taken in conjunction with the accompanying drawings in which:

Figure 1 is a more or less schematic view of apparatus embodying a form of the invention and illustrating the principles of operation thereof;

Fig. 2 is a view in section of apparatus embodying what now appears to be a preferred form of the invention, the device being adapted to continuously split a steam sample into two fractions, one containing the solids in the steam and the other containing the gases, whereby by means of conductivity measurements, the solids content of the solids fraction may be determined and the relative concentration of gas in the gas-containing fraction indicated;

Fig. 3 is an enlarged partial view in section of the float chamber of the apparatus shown in Fig. 2 illustrating the construction of a float-controlled valve;

Fig. 4 is a view in section taken on lines IV—IV of Fig. 3, parts thereof being broken away;

Fig. 5 is a group view showing the valve of Fig. 3 in side elevation and top plan, respectively;

Fig. 6 is a group view showing a detail of the float from which the valve illustrated in Fig. 5 is suspended, the illustration including side and end elevations and top plan views respectively;

Fig. 7 is a view in section of a modification of the form of steam sample receiving vessel shown in Fig. 2, parts thereof being removed; and Fig. 8 is a modified view of the apparatus showing an alternate means for discharging condensate from the steam splitter.

Throughout the specification and drawings, like reference characters indicate like parts.

The invention as exemplified in the drawings is arranged to provide a simple and reliable means for determining steam purity. It is designed to effect the automatic splitting of a flowing steam sample being tested, into two portions, one containing gases only and the other solids, the latter being substantially gas-free.

The various forms of apparatus shown in the drawings function to effect partial condensation of the steam being tested within the steam space of a steam sample receiving vessel having therein a heat exchanger, and it is in the condensate so obtained that the solids are contained. The uncondensed portion of the steam sample contains the gases therein. The portion of the steam sample containing the gases is condensed in a condenser outside the steam space and out of contact with the steam sample, and is returned to the heat exchanger within the steam space of the vessel wherein it is converted into steam by a portion of the total heat of the steam sample. This conversion results in partial condensation of the sample containing the solids and a splitting off of the portion containing the gases.

Depending on the design of the heat exchanger which effects the partial condensation above described, the steam sample may be divided or split into substantially equal portions or into unequal portions, but in any case the ratio of one portion to the other will be substantially constant. The division ratio being substantially constant, measurements of the solids and gas concentrations by any known means, such as with an electric conductivity meter, are not affected as the conversion factor for any split or division ratio is a constant.

Where it is desirable to ascertain both the gas and solids concentrations in the steam being tested, the portion of the steam leaving the heat exchanger and containing the gases may be recondensed and tested by conventional analytical methods for kind and quantity of gases present. If only the solids concentration is desired, the gas containing portion of the steam may be vented to the atmosphere or otherwise disposed of, or if only the gas concentration is desired, the condensate containing the solids may be wasted. If, as will be the case, in general, the steam sample is split into two portions approximately equal in weight, the solids concentration in the solids fraction will be approximately double the concentration of solids in the original steam sample, thereby increasing the accuracy with which analyses for solids in the solids fraction may be made. By making provision for wasting a regulated amount of the G fraction either before or after it is condensed and returned as coolant to the heat exchanger or splitter, the concentration of solids in the solids fraction can be increased to values many times that of the original steam, facilitating a more detailed investigation of specific solid impurities in the steam.

When the pressure of the original steam sample is approximately equal to or less than atmospheric pressure (as might be the case in testing steam from multiple-effect evaporators), it may be necessary to discharge the solids-containing and gas-containing fractions into a system maintained under partial vacuum by suitable means.

In order that the invention may be readily understood, the description immediately following will deal with the schematic illustration of Fig. 1 wherein the principles of the invention are more simply illustrated and in connection with which the heat exchange balances involved will be explained by simple equations.

As illustrated in Fig. 1, the apparatus comprises a steam splitter 1, a separator 2, and condensers 3 and 4. Splitter 1 may be in the form of a heat exchanger comprising a tube or cylinder 5 capable of withstanding any steam pressure (or partial vacuum) encountered in practice, and the heat transfer member 6 in the form of a hollow tube 6 extending through the chamber of splitter 1. The space within cylinder 5 may receive the steam and the space within tube 6 the coolant, so that on the transfer of heat from the steam to the coolant through the walls of tube 6, part of the steam will condense in proportion to the amount of heat transferred. It is also evident that tube 6 may be submerged in the coolant and steam delivered into tube 6 to effect partial condensation of the steam sample. In the various forms shown in the drawings, I have preferred to utilize the space surrounding the heat transfer element such as tube 6, or the coils shown in other views, as the steam sample receiving space and the interior of the heat transfer element as the coolant receiving space. Thus, as shown in Fig. 1, one end of tube 6 is connected to the discharge or exit end of a coil 7 of condenser 3, and the other to the inlet end of a coil 8 in condenser 4.

The separator 2 comprises a pressure-tight reservoir 9 having a float 10 therein and valve 11 operated by the float to maintain a substantially constant level of liquid in the separator. The condensate collected in the separator discharges through valve 11 into a cooling coil 12 of a cooling device 12a in which the condensate is cooled to a desired temperature. The condensate from this cooling device may be analyzed by conventional methods or passed to the conductivity cell of a conductivity meter (not shown) for determining the solids concentration of the condensate.

Steam, the purity of which is to be determined, is supplied to the steam space of splitter 1 by a steam supply pipe 13. The steam sample fills the space surrounding tube 6 and discharges into the separator 2. The condensate resulting from partial condensation in the steam space of splitter 1 is collected in separator 2, while the uncondensed steam flows out of the separator through a pipe 14 to the condenser coil 7. The steam flowing through the condenser coil 7 contains the gases which were present in the total steam sample entering splitter 1. Condenser 3 is so designed and supplied with cooling water at such a rate as to insure that all of the steam entering coil 7 is condensed before it is delivered to tube 6.

The condensate delivered to tube 6 is re-evaporated into steam by the total steam sample in splitter 1. The heat given up by the total steam sample to the condensate in tube 6 results in partial condensation of the steam sample. The amount of partial condensation is proportional to the heat transferred to the gas fraction condensate in tube 6. The part or fraction so condensed flows to the separator 2. This part of the total steam which is thus condensed contains the solids that were present in the total steam sample as delivered to the steam space of splitter 1, and is designated "S" fraction. The uncondensed portion of the steam sample is designated "G" fraction.

As the condensate of the G fraction passes through tube 6, it is re-evaporated into steam and discharges into coil 8 of condenser 4 where it is condensed. The condensate discharging from coil 8 may be analyzed by conventional methods or passed through the conductivity cell of an electric conductivity meter (not shown) whereby the total conductivity attributable to the gases contained in the steam sample delivered to the steam space of splitter 1 may be determined.

From the description above given, it is apparent that a steam sample is in effect split into two portions or fractions one of which is condensed in the presence of the other in the heat exchanger and contains the total solids that were originally in the steam sample and the other portion containing the gases, being condensed outside the steam space of the heat exchanger and utilized as the condensing medium which produces the S fraction.

The rate of flow of steam sample to splitter 1 may be controlled by any suitable means in the sample supply line 13, such as an orifice, capillary tube, needle valve, or flow regulating valve, for example. In Fig. 1, a pressure regulating valve 15 is shown in the supply pipe 13 for the purpose of maintaining the pressure of the steam as delivered to the steam space of splitter 1 at a substantially constant value, if that is desired. Also, a restriction, such as needle valve 16, may be employed in pipe 13, to throttle the flow of steam from separator 2 to condenser 3 to such extent as to insure that the steam pressure in the steam space of splitter 1 will be high enough to effect re-evaporation of the condensate delivered to tube 6 by coil 7 of condenser 3.

In order that condensation of the steam in the splitter 1 from causes other than that represented by the condensate flowing through tube 6, may be held to a minimum, the shell of the splitter may be suitably insulated as indicated by the insulation cover 17. Also to keep heat losses as low as possible, the apparatus should be connected as close to the steam header or steam main as possible, and the sample line 13 should be of smallest convenient diameter and covered with adequate insulation to reduce to a minimum or even eliminate partial condensation of steam before it is delivered to splitter 1.

The following mathematical equations illustrate the heat balances involved in the mutual exchange of heat between the total steam sample and G fraction, respectively, whereby a substantially constant ratio between the S and G fractions are obtained. In order that the equations may be readily interpreted, the letters "a," "b," "c," and "d" have been applied to Fig. 1 to delimit the system and designate the points to which these equations apply.

In the equations, $A_a$=total heat in steam sample entering at point "a" (B. t. u./lb.)
$H_b$=total heat in G fraction steam leaving "b" (B. t. u./lb.)
$h_b$=heat of liquid in S fraction condensate leaving "b" (B. t. u./lb.)
$h_c$=heat of liquid in condensed G fraction at "c" (B. t. u./lb.)
$H_d$=total heat in revaporized G fraction leaving at "d" (B. t. u./lb.)
L=total heat losses from degasser and sample line (B. t. u./hr.)
W=weight of total steam sample (lbs./hr.)
$S_w$=weight of S fraction (lbs./hr.)
$G_w$=weight of G fraction (lbs./hr.)

(1) $S_w + G_w = W$ (2) Total heat entering system (B. t. u./hr.) = $(S_w + G_w)H_a + G_w h_c$ (3) Total heat leaving system (B. t. u./hr.) = $S_w h_b + G_w H_b + G_w H_d + L$ (4) $WH_a + G_w h_c = S_w h_b + G_w(H_b + H_d) + L$ (5) $G_w = W - S_w$, from (1)

(6) $WH_a + (W - S_w)h_c = S_w h_b + (W - S_w)(H_b + H_d) + L$ (7) $WH_a + Wh_c - S_w h_c = S_w h_b + WH_b + WH_d - S_w H_b - S_w H_d + L$ (8) $S_w(H_b + H_d - h_b - h_c) = W(H_b + H_d - H_a - h_c) + L$ (9) $\dfrac{S_w}{W}(H_b + H_d - h_b - h_c) = H_b + H_d - H_a - h_c + \dfrac{L}{W}$

(10) $\dfrac{S_w}{W} = \dfrac{H_b + H_d - H_a - h_c + \dfrac{L}{W}}{H_b + H_d - h_b - h_c}$ "S" fraction

(11) $\dfrac{G_w}{W} = 1 - \dfrac{S_w}{W}$ from (5)

(12) $\dfrac{G_w}{W} = \dfrac{H_a - h_b - \dfrac{L}{W}}{H_b + H_d - h_b - h_c}$ = "G" fraction It will be shown by the following assumptions and by substitution of values assumed in the above equations, that the S and G fractions ($S_w/W$ and $G_w/W$ respectively) remain substantially constant in spite of wide fluctuations in the critical variables, namely (1) pressure and temperature of original steam sample, (2) steam pressure in the separator, (3) condensate temperature at the outlet of condenser 3, (4) pressure of steam exhausting from tube 6, (5) steam sample flow rate, and (6) total heat losses from the splitter and the steam sample piping.

*Assumptions*

1. Steam sample at point "a":

In general, the pressure of saturated steam must vary from approximately 80% to over 100% in order to cause a variation of 1% in total heat content ($H_a$). Most boilers, therefore, deliver steam whose total heat content is virtually constant, despite normal fluctuations in steam pressure and superheat temperature. I assume extreme conditions which represent a variation of about 1% in $H_a$.

Maximum pressure—450 p. s. i. abs.; $H_a$=1204.1 B. t. u./lb.

Minimum pressure—130 p. s. i. abs.; $H_a$=1191.2 B. t. u./lb.

2. Steam pressure in separator, point "b":

Although the pressure in the separator normally fluctuates no more than plus or minus 2 or 3 p. s. i. (and can be held even closer by means of regulating valve 15), I assume extremes more severe than those ever likely to be encountered in practice.

Maximum pressure—30 p. s. i. abs.:
$H_b$=1163.7 B. t. u./lb.
$h_b$=218.7 B. t. u./lb.

Minimum pressure—20 p. s. i. abs.:
$H_b$=1156.0 B. t. u./lb.
$h_b$=196.1 B. t. u./lb.

3. Condensate temperature at outlet of condenser 3, point "c":

With little difficulty, this temperature can be controlled within plus or minus 5° F. of any desired value. I assume a temperature variation of 10° above or below 70° F.

Maximum temperature—80° F.; $h_c$=48.0 B. t. u./lb.

Minimum temperature—60° F.; $h_c$=28.0 B. t. u./lb.

4. Pressure of steam exhausting from tube 6, point "d":

Whether this steam exhausts to the atmosphere or some low pressure steam system, the exist pressure is not likely to fluctuate over a range as great as 10 p. s. i.

Maximum pressure—25 p. s. i. abs.; $H_d$=1160.2 B. t. u./lb.

Minimum pressure—15 p. s. i. abs.; $H_d$=1150.6 B. t. u./lb.

5. Steam sample flow rate:

Although it is difficult to maintain a precisely constant sample flow rate, simple devices (orifice, needle valve, capillary tube, pressure regulating valve) can be employed to hold this flow reasonably steady. I assume 10% variation above and below a typical average flow rate.

Maximum flow rate (W) = 22 lb./hr.
Minimum flow rate (W) = 18 lb./hr.

6. Total heat loss from the steam splitting apparatus and the steam sample piping:

This quantity can be kept at a minimum, through the use of a short, well insulated sampling line of small diameter, and adequate insulation on the apparatus itself. Field tests indicate that the total heat loss can be reduced to about 1500 B. t. u./hr. or less. It remains substantially constant, for a given installation, being only feebly affected by reasonable variations in room temperature.

Total heat loss (L) =1500 B. t. u./hr.

Substituting, in Equation 10, those values which yield maximum value for the S fraction ($S_w/W$), $H_a$=1191.2 B. t. u./lb.
$H_b$=1163.7 B. t. u./lb.
$H_d$=1160.2 B. t. u./lb.
$h_b$=218.7 B. t. u./lb.
$h_c$=28.0 B. t. u./lb.
$L$=1500 B. t. u./hr.
$W$=18 lb./hr.

$$\frac{S_w}{W} = \frac{1163.7 + 1160.2 - 1191.2 - 28 + \frac{1500}{18}}{1163.7 + 1160.2 - 218.7 - 28} = \frac{1188.0}{2077.1}$$

=0.572 (maximum S fraction)

From Equation 11, $$\frac{G_w}{W} = 0.428 \text{ (minimum G fraction)}$$

Likewise, for minimum value of S fraction, $H_a$=1204.1 B. t. u./lb.
$H_b$=1156.0 B. t. u./lb.
$H_d$=1150.6 B. t. u./lb.
$h_b$=196.1 B. t. u./lb.
$h_c$=48.0 B. t. u./lb.
$L$=1500 B. t. u./hr.
$W$=22 lb./hr.

$$\frac{S_w}{W} = \frac{1156.0 + 1150.6 - 1204.1 - 48 + \frac{1500}{22}}{1156.0 + 1150.6 - 196.1 - 48} = \frac{1122.7}{2062.5}$$

=0.544 (minimum S fraction)

$$\frac{G_w}{W} = 0.456 \text{ (maximum G fraction)}$$

The foregoing sample calculations, for an assumed typical installation, show that the total steam sample is split into two components, an S fraction and a G fraction; the weight ratio of S fraction to G fraction is determined by heat balance characteristics under the conditions assumed, but the split remains substantially constant (deviating, in this extreme case, by only 2.5% away from the mean S fraction value) despite severe fluctuations in the operational variables. Field tests have shown the deviation to be even less than 2.5%. This splitting of the sample into two approximately equal and substantially uniform fractions is of paramount importance in the isolation of solids and gases and the practical operation of the equipment.

If the steam sample entering splitter 1 is split into two fractions, in the average proportion 55.8% for the S fraction and 44.2% for the G fraction, this means that for every 100 pounds of steam passing through the heat exchanger, the S fraction will weigh 55.8 pounds and the G fraction, 44.2 pounds.

Therefore, if analysis by conventional methods gives a value of say 10 P. P. M. solids in the S fraction, the total solids in the steam entering the splitter 1 will be 10 multiplied by 0.558 or 5.6 P. P. M. of solids in the original steam sample. Suppose the S fraction should fluctuate between limits of 0.544 and 0.572 as assumed above for exceptionally wide variations in the critical variables, the error thus introduced would be on the order of 2.5% of 5.6, or about 0.14 P. P. M. which which is a trivial error according to present standards.

Likewise, if analysis shows a concentration of say 50 P. P. M. of gas in the G fraction, the total concentration of gas in the steam sample that enters the splitter 1 is obtained by multiplying 50 P. P. M. by 0.442, or 22.1 P. P. M.

In the description up to this point, the steam sample splitting device or apparatus has been shown as splitting the total steam sample into substantially equal portions, the G and S fractions respectively. This means that with respect to the S fraction, the concentration of solids in it will be approximately twice as high as the concentration of solids in the original steam sample. There may be occasions when it is desirable to have a more concentrated S fraction. For example, if the original steam sample has a very low concentration of solids to begin with, then even if the S fraction has a concentration approximately twice as large, the concentration still may be so low as to make it difficult to either chemically analyze the solution for the solids or to get a large enough scale deflection on the conductivity meter when the electrical conductance of the S fraction is measured. Therefore, by making provision for obtaining a more concentrated S fraction, more accurate readings may be obtained by the electric conductivity method. Also, if it is desired to determine the solids content of S fraction for chemical analysis, it is much better to concentrate the S fraction as highly as possible in the steam splitting apparatus so as to avoid the necessity of boiling down the sample in preparation for chemical analysis.

In order to obtain the more highly concentrated S fraction, I may provide a T-connection having a bleed valve 19 in the flow line for the G fraction either ahead of or following condenser 3. I prefer that the T-connection be made in the line at point "c" at the discharge side of the G fraction condenser. If a portion of the G fraction is drained off at this point, less of the G fraction condensate will pass to the heat exchanger tube 6. This will result in a proportionately smaller S fraction being formed in the steam receiving chamber of the steam splitting apparatus. The ratio of S fraction to G fraction will still remain as it was before, although the ratios $S_w/W$ and $G_w/W$ will be reduced in proportion to the amount of condensate withdrawn through bleed valve 19. By means of the bleed off valve 19, the concentration of the S fraction and consequently the ratio of the weight of the S fraction to the total weight of steam entering the steam splitting apparatus ($S_w/W$) may be varied at will to provide any desired value of concentration in the S fraction, less than that which would be obtained by the natural heat balance characteristics of the apparatus. The bleed off valve 19 renders the steam splitting apparatus more or less semi-manual rather than automatic in operation, but it makes of the steam splitting apparatus a valuable tool in certain types of steam purity investigations. By measuring the amount of condensate withdrawn through bleed off valve 19 and the amounts of G fraction and S fraction condensate discharging from condenser 4 and separator 2, respectively, the ratio of the weight of the S fraction to the total weight of steam entering the steam splitting apparatus can be readily calculated, as can also be the ratio of the weight of the G fraction to that of the total sample. These ratios, together with analyses of the S and G fractions, can then be used for calculating the concentrations of solid and gaseous impurities in the original steam sample.

It is contemplated that the effluent from separator 2 (Fig. 1), that is the S fraction, shall flow through cooling coil 12 disposed in jacket 12a through which cooling water is circulated to reduce the temperature of the S fraction to a predetermined value. This temperature should be one suited to the testing procedure employed for subsequent analysis of the S fraction. The temperature should be held at some optimum value so that if desired, continuous conductivity recordings indicative of solids concentration may be made that will be free as possible of error attributable to temperature variations in the S fraction.

Condenser 4 may be designed and operated as a condenser-cooler so that the G fraction condensate will be reduced to and maintained at a temperature suited to the testing procedures used for subsequent analysis of the gas fraction, or a temperature at which suitable conductivity equipment may be used to accurately indicate and record the conductance of the gas fraction.

When designing a steam splitting apparatus such as shown diagrammatically in Fig. 1, it is to be recognized that the heat transfer elements 6 and 7 shall be such that the uncondensed vapor leaving the separator is first completely condensed and then completely re-vaporized; for then the quantity of S fraction condensate formed on one side of heat exchanger 6 will be approximately equal to the amount of G fraction condensate re-vaporized on the other side, and the ratio of S to G will remain substantially constant. It is not necessary that the S and G fractions be equal, and in practice their actual values will differ with each individual installation. But it is essential—and by means of the apparatus herein described, it is possible—to maintain an S/G ratio which is substantially constant under all conditions of operation for a given installation. When this ratio remains constant, the factor for converting the concentration of solids in the S fraction and the concentration of gas in the G fraction will be constant for all flows of steam through the splitting apparatus regardless of the pressure of the steam as delivered to the steam space of splitter 1, the pressures developed in the tube 6 and so forth, as has been previously mentioned.

In Fig. 2, I have illustrated what now appears to be a preferred construction of steam splitting apparatus embodying the principles of the invention described in connection with Fig. 1. In the form shown in Fig. 2, a cylinder 20 is employed and provided near its bottom or lower end with a partition 21 that divides the cylinder into two sections designated by numerals 22 and 23 respectively. Because of the partition 21, section 22 functions both as the steam splitter and separator of Fig. 1 and section 23 serves the function of a float valve chamber. In section 22 is mounted the heat transfer element in the form of a multiple coil 24. This coil corresponds in function to tube 6 of Fig. 1. While a multiple coil is preferred, I may use a single continuous coil or a plurality of coils. As shown, coil 24 comprises three separate coils, the opposite ends of which are connected to headers 25 and 26 respectively, so that these coils are in parallel. The upper end of the cylinder is closed by means of a head plate 27 into which a pipe 28 is threaded. The G fraction condenser 3 may be mounted in any suitable location or position with respect to cylinder 20 but as shown it is disposed near the top of the cylinder with the inlet end of the condenser coil 7 connected to the interior of pipe 28. The outlet end of the condenser coil 7 is connected to header 25. Thus the condensed G fraction enters header 25 and flows through the three coils in parallel into header 26 from which it discharges as vapor through a pipe 29 into the inlet end of coil 8 of condenser 4. Pipe 28 may be provided with a pressure gauge 30 in order that it may be readily ascertained what the pressure is in the steam space of sections 22 and 23.

The total steam sample enters section 22 through the lower part of the cylinder at a point slightly above the partition 21. The steam is supplied through pipe 32 (corresponding to pipe 13 of Fig. 1) and passes through a multiple re-boiling coil 33, the windings of which are in parallel, and discharges from the outlet ends of the re-boiling coils into the space surrounding the exchanger 24. The outlet ends of these coils extend vertically a substantial distance above the coils 33. The tips of these coils are restricted at 35 and 36 respectively so that pressure of the steam within the coils 33 will be higher than the steam pressure in section 22 by an amount sufficient to effect continuous re-boiling of the S fraction condensate which accumulates on partition 21. While a multiple coil is preferred, I may use a single continuous coil or a plurality of coils.

In order to regulate the height of the S fraction condensate that accumulates on partition 21, an overflow pipe 37 is provided. The height of this pipe is such as to provide a pool of S fraction condensate of sufficient depth to keep the re-boiling coils 33 submerged. In order that the S fraction condensate may flow through pipe 37 into float chamber 23 without obstruction or hindrance from steam binding or other cause, a vent tube 38 is provided by which communication is established between chambers 22 and 23. The vent pipe 38, as shown, extends upwardly into the heat exchanger chamber to a greater height than does the overflow pipe 37.

When the steam splitting apparatus is placed in operation, needle valve 16 in the connection between the inlet to the condenser coil 7 and pipe 28 is adjusted to give a definite pressure in the splitter and separator chamber 22. This pressure should be high enough to provide sufficient temperature differential between the exterior of the re-evaporating or heat exchanger coils 24 and the G fraction condensate that flows into them from the condenser 3, to effect complete evaporation of the G fraction condensate into steam before it discharges from these coils into condenser 4.

The condensate which collects on partition 21 may contain a slight residual of dissolved gas. By means of coils 33, this (the S fraction) condensate is boiled to effect further removal of the contaminating gas, such gas being released and passed on to condenser 3 along with the G fraction steam. In this manner the gas content of the S fraction can be reduced to a minimum. Tests performed on the apparatus have shown the gas removal from the S fraction condensate to be so complete that standard tests for carbon dioxide and ammonia, for example, were not sensitive enough to reveal the small amounts of residual carbon dioxide and ammonia, the residual ammonia being less than 0.05 P. P. M.

The S fraction condensate which accumulates in chamber 23 under the control of the float 10 and valve 11 flows from the separator chamber to the cooling coil 12 where the S fraction sample is cooled to a desired temperature as and for the purpose described in connection with Fig. 1.

The details of construction of the float 10 and valve 11 are illustrated more in detail in Figs. 3 to 6 inclusive.

In the enlarged view (Fig. 3) of the lower end of chamber 23, valve 11 is shown as comprising a body 40 which is screwed into the bottom header plate 41 of cylinder 20. This body is provided with a valve seat 42 through which the S fraction condensate flows into a pipe 43 leading to the cooling coil 12. The valve element 44 as indicated, has a conical valve surface 45 at its lower end and is provided with a head 46 at its upper end, the stem in between being substantially triangular in shape to permit adequate flow between the stem and bore of the valve body.

The head 46 of the valve is suspended from a fulcrum clip 47 secured to the bottom of float 10 at one side thereof. The fulcrum clip consists of a U-shaped member having a bottom portion 48 provided with a slot 49. The valve is mounted in clip 47 by sliding the neck 50 of the valve through slot 49 so that the head 46 rests on the top of the bottom portion on either side of the slot. Clip 47 is then placed between the bearing pieces 52 and 53 secured to the bottom or head plate 41 and a bearing pin 54 is inserted through the bearing holes in the supports and the clip. Float 10 may be of any suitable construction but is preferably round, hollow, and fluidtight. The buoyancy of the float is such that valve 44 will be so adjusted that a substantially constant level of S fraction condensate is maintained in chamber 23.

As was stated in the beginning of the description of the preferred form of apparatus shown in Fig. 2, the apparatus includes a re-boil such as indicated at 33. The function of this re-boil coil is to remove or eliminate as much as possible the residual gas from the S fraction condensate so that the conductivity measurement of the S fraction will be as free of gas error as possible. However, for many applications where it is not essential to have the gas removed as thoroughly as it may be in the preferred form, the re-boil coil may be eliminated.

In Fig. 7, a steam splitter is illustrated, which is in all material respects the same as that shown in Fig. 2, with the re-boil coil omitted; therefore, similar parts are designated by the same reference characters. In this case, the steam is admitted through a pipe 56 (corresponding to pipe 13 of Fig. 1) into the steam splitting chamber 22 at a point above the S fraction condensate level and is directed upwardly towards the re-evaporating or exchanger coils 24. The S fraction condensate overflows the overflow pipe 37 into chamber 23 from which it flows through the cooling coil 12 and thence to the testing apparatus (not shown). If desired, partition 21 may be omitted from the form of splitter illustrated in Fig. 7.

If desired a baffle 60 may be mounted in space 22 above the nozzle of steam sample supply pipe 56 to prevent direct impingement of the steam sample on coil 24. Baffle 60 may also be employed in the form of device shown in Fig. 2.

In the forms above described, a float operated valve has been described as a means for controlling the discharge of S fraction condensate from the separator. A float operated valve of different design or other suitable device may be employed for this purpose. For example, the S fraction condensate may be continuously discharged through a water column having a head sufficient to balance the pressure in the steam space of the steam sample splitter. Such an arrangement is diagrammatically illustrated in Fig. 8. As shown, the S fraction condensate flows through cooler 12a, a conductivity cell CC and a water column 61 the height of which can be so adjusted that the S fraction may flow to waste at a rate substantially equal to that at which it is formed in the steam splitter.

In the embodiments of Figs. 2, 7, and 8, I may employ a bleed off valve 19' to provide a more highly concentrated solids fraction (S fraction) as explained in connection with Fig. 1.

The arrangements shown in Figs. 1, 2, and 7 are such that the conductivity and chemical composition of both the S fraction condensate and the G fraction condensate may be determined. Where it is not necessary or desirable to make conductivity measurements on the G fraction, condenser 4 may be omitted and the steam formed in the tube 6 or the re-evaporating coils 24 may be allowed to discharge to the atmosphere or some low-pressure steam system. In such case, it may be desirable with or without the condenser 4 being employed to utilize a needle valve or other suitable valve in the outlet of tube 6 or the coils 24 to adjust the back pressure in the steam space of tube 6 or the coils 24. This back pressure may be adjusted to any value desired if back pressure is necessary.

In operation, the apparatus is mounted in any suitable place convenient for the testing of the steam for purity. The steam inlet pipe (13, 32, or 56) is connected to a steam sampling connection in the steam main which receives steam from one or more boilers, as shown in Fig. 1 or, if it is desirable to know the steam purity of steam at any point in the steam system, to the steam pipe in the system at the location required. A restriction such as valve 15, or an orifice or other suitable device may be placed in the steam supply pipe so as to regulate the pressure at which the steam is delivered to the re-boil coil 33 if such is used, or the pressure at which the steam is delivered into the steam space of the splitter, if the re-boil coil is omitted as in Fig. 7. The needle valve 16 just ahead of the condenser 3 is adjusted so that the pressure within the steam space of the heat exchanger is of the value required to insure complete evaporation of the G fraction condensate that is delivered to the heat exchanger coils 24.

When connecting the steam splitting apparatus to a steam header or other steam pipe, it is desirable that the pipe leading from the steam header or steam main to the apparatus should be as short and as small in diameter as possible and insulated sufficiently to minimize condensation of steam in the line before it reaches the device. If condensate flows into the splitter, the splitting of the steam will not be affected; however, there will be more water comparatively speaking appearing in the S fraction than would result from the splitting of the steam within chamber 22 into the S and G fractions. This condensation causes the S fraction to appear larger than would otherwise be the case. In practical tests the effect of condensation has not been found to be of any material consequence in the operation of the apparatus.

Having thus described the invention, what I claim as new and desire to secure by Letters Patent is:

1. Apparatus for splitting a steam sample containing gases and solids into two portions, the one being a steam portion containing the gases and the other a liquid portion containing the solids, comprising a steam splitter having a chamber therein for receiving the steam sample, a heat exchange element in said chamber, a condenser outside said chamber, means for passing steam from said chamber to said condenser, means for passing the condensate formed in said condenser through said heat exchange element out of contact with the steam in said chamber, whereby said condensate is re-evaporated into steam with heat supplied by the steam sample in said chamber and the steam sample is partially condensed and split into said solids and gas containing portions, the portion containing the gases passing to said condenser where it is condensed to form the heat exchange element cooling medium for effecting the split of said steam sample, means for collecting said solids containing portion, and means for removing said solids portion from said apparatus whereby it may be analyzed for solids concentration, and means for discharging the steam from said exchange element as it is formed therein.

2. Apparatus according to claim 1 characterized by the fact that means are provided for adjusting the pressure in said chamber to a value higher than the pressure in said heat exchange element by an amount sufficient to effect substantially complete evaporation of the gas containing portion as it passes through said heat exchange element.

3. Apparatus according to claim 1 characterized by the fact that means are provided for bleeding off a portion of the gas containing condensate as it leaves the condenser whereby a more highly concentrated solids containing portion will condense in said splitter.

4. Apparatus according to claim 1 characterized by the fact that the splitter is covered with insulation to minimize the formation of condensate in the splitter resulting from radiation rather than heat exchange between the gas containing condensate in the exchange element and the steam in the splitter.

5. Apparatus for splitting a flowing steam sample into two portions, one containing the gases and the other the solids therein, said device comprising a steam chamber having an outlet for steam, a water-cooled condenser having its cooling coil connected at one end to said steam chamber outlet, a heat exchange element mounted in said steam chamber, said exchange element being connected at one end to outlet of the cooling coil in said water-cooled condenser and having its opposite end passing out of said steam chamber, a second water-cooled condenser having its cooling coil connected to the outlet of said exchange element, means for continuously passing steam into said steam chamber, means between said steam chamber and said first mentioned condenser for so adjusting the flow of steam to said first mentioned water-cooled condenser that a positive pressure is maintained within said steam chamber, whereby steam passing into the first mentioned water-cooled condenser is condensed and the condensate therefrom is delivered to said heat exchange element and re-evaporated therein by the steam in said steam chamber thereby causing a portion of the steam in said steam chamber to be condensed by giving up the heat required to re-evaporate the steam in said exchange element, the quantity of said steam which is condensed corresponding to that fraction of the total heat content of the steam which is required to re-evaporate the condensate delivered to said exchange element, and means for discharging the condensate in said chamber to the exterior thereof, the condensate discharged from said second mentioned water-cooled condenser containing the gases entrapped in the steam entering the steam chamber and the condensate discharged from said chamber containing the dissolved solids contained in said steam.

6. Apparatus for removing gases from steam containing solids so that the solids content of the steam can be determined substantially free from gas error, said apparatus comprising a closed vessel, a closed heat exchange element in said vessel having an inlet and an outlet, an outlet for said vessel for non-condensed steam, a condenser connected to said outlet and to the inlet of said heat exchange element, the non-condensed steam being condensed in said condenser and passing as liquid to said heat exchange element wherein it is re-evaporated by the steam entering said vessel, the heat given up to said condensate to effect re-evaporation thereof effecting the condensation of a part of the steam entering said chamber, the part so condensed being in proportion to the heat content given up to the liquid in said heat exchange element, the condensate in said vessel being discharged therefrom substantially free from gases and containing therein the solids present in the steam as delivered to said vessel, the steam discharging from the outlet of said heat exchange element containing the gases present in the steam delivered to said vessel.

7. A device for separating flowing steam into two portions bearing a substantially constant ratio one to the other, one portion containing the gases and the other the solids in the steam so that the concentration of solids and the concentration of gases in the steam may be selectively determined, said device comprising a closed vessel, a closed heat exchange element therein, means for supplying steam to said vessel, means for collecting condensate formed in said vessel, a reservoir communicating with said vessel for receiving said condensate, an outlet for said reservoir through which condensate discharges, means for regulating the flow of condensate through said outlet to maintain a predetermined quantity of condensate in said reservoir, a condenser connected to said vessel and to the inlet of said heat exchange element whereby steam containing the gases is passed from said vessel to said condenser and then to said heat exchange element, the steam required to re-evaporate the condensate delivered to said heat exchange element condensing in said vessel and discharging in said reservoir, said condensate containing the solids originally present in the steam as delivered to said vessel, the portion of said steam not condensed in said vessel and containing the gases passing out of the vessel through said condenser and heat exchange element and discharging continuously from the outlet of said exchange element.

8. A device according to claim 7 characterized by the fact that means are provided for heating and boiling the condensate collected in said vessel to remove from the condensate, gas taken up by the condensate formed from the portion of the steam utilized to re-evaporate the condensate in the heat exchange element.

9. A device according to claim 7 characterized by the fact that a steam coil is provided in the vessel and submerged in the condensate collected in said vessel, said coil being connected at one end to the source of steam supplied to said vessel and having an orifice through which steam is discharged into said vessel at a pressure lower than that existing in the coil, and means in the flow connection between the vessel and said condenser for maintaining a pressure in said vessel higher than that existing in said heat exchange element.

10. A device according to claim 7 characterized by the fact that the heat exchange element comprises a plurality of parallel connected coils disposed to receive the condensate from said condenser.

11. A device according to claim 7 characterized by the fact that a plurality of steam coils are connected in parallel to the steam supply source and that each is provided with a restricted outlet through which steam discharges into said vessel at a pressure lower than the pressure in said coil, said steam coils being submerged in the condensate formed in said vessel, and an orifice in the flow connection between said vessel and said condenser for adjusting the pressure of the steam in the vessel to a value higher than the pressure in said heat exchange element.

12. A device according to claim 7 characterized by the fact that the vessel is provided adjacent its bottom with a pressure tight receptacle, the condensate in said vessel collecting in the space above said receptacle, an overflow pipe in said vessel communicating with said receptacle and having its overflow end spaced from the bottom of the vessel at a height sufficient to maintain a pool of condensate having a predetermined depth, a steam coil in said vessel submerged in said pool, said coil being connected at one end to the steam inlet to the vessel and the opposite end thereof being provided with a restriction and discharging at a point above the surface of said pool, and means for regulating the discharge of condensate from said reservoir.

13. Apparatus for separating flowing steam into two fractions, one containing substantially solids only and the other containing substantially all the gases in the steam, comprising a closed vessel having an inlet through which said steam is supplied to the vessel, a tubular evaporator in said vessel, a condenser located outside the vessel, said condenser having its inlet connected to said vessel and its outlet connected to the inlet of said evaporator, the outlet of said evaporator being outside said vessel, and means for collecting condensate formed in said vessel and discharging the same therefrom, said apparatus being characterized in operation by the fact that the portion of the steam which remains uncondensed in the vessel passes to the condenser outside the vessel wherein it is condensed and the condensate thereof flows to the evaporator where it is evaporated into steam, the heat required for said evaporation being supplied by the steam sample in said vessel whereby the weight of the portion condensed from the sample is proportional to the heat given up to the condensate in the evaporator, so that the ratio of the portion containing solids to the portion containing the gases is substantially constant.

14. Apparatus according to claim 13 characterized by the fact that a predetermined amount of the condensate leaving the condenser is discharged and the remainder is passed to the evaporator whereby the volume of condensate containing the solids is reduced and the concentration of solids therein can be adjusted as desired, without materially affecting the ratio of the weight of the portion discharging from the evaporator to the weight of the portion containing the solids.

15. The method of determining the gas and solids contents of steam that comprises passing the steam to be analyzed into a steam chamber having therein a closed heat exchange element, conducting steam from said chamber into a water-cooled condenser wherein the steam is condensed, passing said condensate into said closed heat exchange element whereby the same is re-evaporated by the steam in said chamber and whereby a portion of the total steam sample corresponding in heat content to the heat required to evaporate the condensate in said heat exchange element, is condensed in said chamber, passing the re-evaporated condensate from said heat exchange element to a condenser and conducting the condensate from said condenser to a sampling point for testing of gas content and discharging the condensed portion from the steam chamber to another sampling point for testing of dissolved solids content.

16. A method according to claim 15 characterized by the fact that the steam condensing in said steam chamber is collected in a pool, that said condensate is withdrawn from said pool at such a rate as to maintain said depth of condensate, and continuously boiling said condensate to remove residual gases therefrom so that the same may be passed out of the steam chamber with the steam that flows to the water-cooled condenser following the steam chamber.

17. A method according to claim 15 characterized by the fact that the steam condensing in said steam chamber is collected in a pool, and applying heat to said pool to effect continuous boiling thereof to remove residual gases in the condensed steam and to insure that substantially all of the gas in the total steam sample is passed on through to the condenser and the heat exchange element in said steam chamber.

18. Apparatus for splitting a flowing steam sample containing solids and gas into two portions, one containing the gases and the other the solids, comprising a heat-exchanger having therein a steam space and a coolant space separated from the steam space by a heat transfer wall, a condenser outside said heat-exchanger, means for supplying a flowing steam sample to the steam space of said heat-exchanger, means for passing steam from steam space of said heat-exchanger to said condenser, means for passing the condensate formed in said condenser to the coolant space of said heat-exchanger whereby said condensate is evaporated into steam by heat given up thereto from the steam sample through said heat transfer wall and a part of said steam sample is condensed, the quantity of steam sample condensed being proportional to the amount of heat given up to said condensate in the coolant space, the steam condensing in the steam space containing the solids of the steam sample and the uncondensed steam passing from the steam space to the condenser containing the gas of the steam sample, means for removing the solids containing condensate from the heat-exchanger, and means for discharging the evaporated condensate from said coolant space.

19. Apparatus according to claim 18 characterized by the fact that the coolant space is formed by a hollow tube one end of which is connected to said condenser to receive condensate therefrom, and the other end being disposed to discharge the re-evaporated condensate outside the heat-exchanger.

20. Apparatus according to claim 18 characterized by the fact that means are provided in the connection between the steam space of said heat-exchanger and the inlet to said condenser for adjusting the pressure in said steam space to a value higher than the pressure obtained in said coolant space.

21. Apparatus according to claim 18 characterized by the fact that means are provided for collecting the condensate formed in the steam space and that means are provided for boiling said collected condensate to remove gas therefrom and return it to the uncondensed steam issuing from said steam space.

22. Apparatus according to claim 18 characterized by the fact that a chamber communicating with said steam space is provided for collecting the condensate formed in said steam space, that a tube is disposed in said collecting chamber and submerged in the condensate therein, said tube being connected to the steam inlet to said steam space and discharging at a point above the condensate level in said collecting chamber whereby a part of the heat in the steam sample is utilized to boil the condensate and remove residual gas therefrom, and that the solids containing condensate removal means is disposed to remove condensate from said collecting chamber.

23. Apparatus for effecting self-regulated partial condensation of a flowing mixed vapor capable of being condensed to liquid and re-evaporated to split the vapor into separate components each bearing a substantially constant ratio to the other, comprising a heat-exchanger having therein a coolant space separated from the vapor space by a heat transfer wall, a condenser outside said heat-exchanger, means for supplying said vapor to the vapor space of said heat-exchanger, means for passing vapor from said vapor space to said condenser, means for passing the condensate formed in said condenser to the coolant space of said heat-exchanger whereby said condensate is re-evaporated by heat given up thereto by said mixed vapor through said heat transfer wall and a part of said mixed vapor is condensed, the quantity condensed being proportional to the heat given up to the condensate in said coolant space, the uncondensed portion of said mixed vapor passing to said condenser, means for removing from the vapor space the condensate formed therein, and means for discharging from said coolant space the vapor formed therein from said condenser condensate.

HUBERT M. RIVERS.

REFERENCES CITED

The following references are of record in the file of this patent:

UNITED STATES PATENTS

| Number | Name | Date |
| --- | --- | --- |
| 1,730,892 | Leslie | Oct. 8, 1929 |
| 2,046,583 | Rummel | July 7, 1936 |
| 2,146,312 | Powell et al. | Feb. 7, 1939 |
| 2,303,572 | Mumford et al. | Dec. 1, 1943 |
| 2,406,375 | Hoyte | Aug. 27, 1946 |

OTHER REFERENCES

Place: American Soc. for Testing Materials "Proceedings of the 44th Annual Meeting," vol. 41 (1941), pages 1302–1312.